UNITED STATES PATENT OFFICE.

EMIL ELSAESSER, OF BARMEN, GERMANY, ASSIGNOR TO DAHL & CO., OF SAME PLACE.

GREEN DYE AND PROCESS OF MAKING IT.

SPECIFICATION forming part of Letters Patent No. 548,158, dated October 15, 1895.

Application filed April 27, 1895. Serial No. 547,396. (Specimens.)

*To all whom it may concern:*

Be it known that I, EMIL ELSAESSER, a subject of the King of Würtemberg, residing at Barmen, Prussia, German Empire, have invented certain new and useful Improvements in Methods of Producing Green-Mordant Dye-Stuffs, of which the following is a specification.

My invention consists in the production of dye-stuffs by the combination of one molecule of beta-naphthoquinone sulfonic acid (O:O:SO.3H—1:2:4) with one molecule of a orthoamidonaphthol sulfonic acid, and boiling this condensation product in an alkaline solution with or without the addition of a further half molecule of beta-naphthoquinone sulfonic acid. The dye-stuffs so obtained form dark powders, which dissolve with a green color with difficulty in cold, but more readily in hot water. On the addition of acids to the aqueous solution the color is transformed to red. Wool, cotton, and silk previously mordanted with chrome oxid are dyed green by these dye-stuffs. The formula for these dye-stuffs is not yet ascertained.

*Production of the new dye-stuffs.*—First. Dye-stuffs from beta-naphthoquinone sulfonic acid and beta$_1$ amido-alpha$_1$ naphthol-alpha$_2$ sulfonic acid: Twenty-four kilograms (one molecule) of amido-alpha naphthol-sulfonic acid and twenty-eight kilograms (one molecule) of the potash salt of beta-naphthoquinone sulfonic acid are mixed with four hundred liters of water and allowed to stand with frequent stirring at ordinary temperature. After about twenty-four hours a solution of twenty kilograms of soda in sixty liters of water is added and heated to boiling. As soon as the brownish-black solution boils gently, an additional fourteen kilograms (one-half molecule) of the potash salt of beta-naphthoquinone sulfonic acid is added in small portions at a time. On the addition of each portion a violent effervescence takes place. When the whole of the fourteen kilograms has thus been added, the solution is allowed to boil for three hours longer under addition of water to replace the loss by evaporation. Then allow to cool. The new dye-stuff separates out a crystalline powder, is then filtered, washed, and dried. If the condensation product from one molecule of amido-naphthol sulfonic acid and one molecule of the potash salt of beta-naphthoquinone sulfonic acid is boiled without the further addition of fourteen kilograms of the potash salt of beta-naphthoquinone sulfonic acid a much smaller yield of dye-stuff is obtained.

Second. Dye-stuff from alpha$_1$ amido-beta$_1$ naphthol-alpha$_2$ sulfonic acid and beta-naphthoquinone sulfonic acid: Twenty-four kilograms (one molecule) of amido-beta naphthol sulfonic acid are stirred with twenty-eight kilograms (one molecule) of the potash salt of beta-naphthoquinone sulfonic acid and four hundred liters of water. After standing a day the mixture becomes brown, and a solution of twenty kilograms of soda in sixty liters of water is then added and the whole heated to boiling, on which an additional fourteen kilograms of the potash salt of beta-naphthoquinone sulfonic acid is gradually added. After further boiling for three to four hours with replacement of the loss from the evaporation of the water the mixture is allowed to cool, the precipitated dye-stuff is filtered out, washed, and dried.

Having thus fully described my invention, what I claim as new, and desire to secure by Letters Patent of the United States, is—

1. The method of producing green mordant dye-stuffs, consisting in the combination of one molecule of naphthoquinone sulfonic acid (O:O:SO.3H—1:2:4) with one molecule of ortho amidonaphthol sulfonic acid, and boiling this condensation product in an alkaline solution, all substantially as herein set forth.

2. The green mordant dyestuffs derived from beta naphthoquinone sulfonic acid and ortho-amidonaphthol sulfonic acid, forming dark powders which dissolve with a green color with difficulty in cold, but more readily in hot water, and on the addition of acids to the aqueous solution the color is transformed to red, substantially as herein described.

In testimony whereof I have signed my name to this specification in the presence of two subscribing witnesses.

EMIL ELSAESSER.

Witnesses:
 A. DAHL,
 F. H. STRAUSS.